United States Patent
Oyanagi et al.

(10) Patent No.: US 6,833,204 B2
(45) Date of Patent: Dec. 21, 2004

(54) METHOD OF OPERATING PHOSPHORIC ACID FUEL CELL

(75) Inventors: Hiroyuki Oyanagi, Saitama-ken (JP); Shuji Sato, Kawagoe (JP); Masahiro Ise, Asaka (JP); Takafumi Okamoto, Koshigaya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 60 days.

(21) Appl. No.: 09/895,546

(22) Filed: Jun. 29, 2001

(65) Prior Publication Data

US 2002/0012822 A1 Jan. 31, 2002

(30) Foreign Application Priority Data

Jun. 30, 2000 (JP) ........................................ 2000-199633

(51) Int. Cl.[7] .............................. H01M 8/08; H01M 8/04
(52) U.S. Cl. .............................. 429/13; 429/25; 429/46
(58) Field of Search ............................... 429/13, 25, 46

(56) References Cited

U.S. PATENT DOCUMENTS 4,362,788 A * 12/1982 Maru et al. .................... 429/13
4,978,591 A    12/1990 Wright ........................ 429/35
5,525,436 A     6/1996 Savinell et al. ............... 429/30
6,093,502 A *  7/2000 Carlstrom et al. ............ 429/25

FOREIGN PATENT DOCUMENTS

| EP | 0 273 427 A2 | 7/1988 | |
|---|---|---|---|
| JP | 05003042 A | 1/1993 | ............ H01M/8/04 |
| JP | 09320620 A | 12/1997 | ............ H01M/8/04 |

* cited by examiner

Primary Examiner—Stephen J. Kalafut
(74) Attorney, Agent, or Firm—Lahive & Cockfield, LLP; Anthony A. Laurentano (57) ABSTRACT

A method of operating a phosphoric acid fuel cell is provided, in which the phosphoric acid fuel cell effects power generation at a high output. A power-generating cell is provided with an electrolyte layer comprising a matrix composed of basic polymer impregnated with acidic liquid electrolyte such as phosphoric acid. The phosphoric acid fuel cell has a fuel cell stack comprising a single unit of the power-generating cell or a predetermined number of the power-generating cells electrically connected in series to one another. When the phosphoric acid fuel cell is operated, the supply pressures of the oxygen-containing gas and the hydrogen-containing gas are set so that the pressure on a cathode electrode of the power-generating cell is higher than that of an anode electrode.

11 Claims, 5 Drawing Sheets

| | | GAS UTILIZATION FACTOR [%] #1 | GAS PRESSURE [kPa] #2 | PRESSURE RATIO BETWEEN BOTH ELECTRODES | OPERATING TEMPERATURE [°C] |
|---|---|---|---|---|---|
| WORKING EXAMPLE 1 | ANODE ELECTRODE | 67 | 151.3 | 1.99 | 160 |
| | CATHODE ELECTRODE | 50 | 301.3 | | |
| WORKING EXAMPLE 2 | ANODE ELECTRODE | 67 | 151.3 | 1.33 | 160 |
| | CATHODE ELECTRODE | 50 | 201.3 | | |
| COMPARATIVE EXAMPLE | ANODE ELECTRODE | 67 | 201.3 | 1 | 160 |
| | CATHODE ELECTRODE | 50 | 201.3 | | |

1: GAS UTILIZATION FACTOR
 = (GAS CONSUMPTION AMOUNT / GAS SUPPLY AMOUNT) X 100

2: ABSOLUTE PRESSURE DETERMINED FROM MEASURED VALUES OF INLET SIDE PRESSURE SENSORS 66a, 66b

FIG. 5

METHOD OF OPERATING PHOSPHORIC ACID FUEL CELL

RELATED APPLICATIONS

This application claims priority to Japanese Patent Application No. 199633/2000, filed on Jun. 30, 2000 in Japan. The contents of the aforementioned application are hereby incorporated by reference.

BACKGROUND OF THE INVENTION

1. Field of the Invention

The present invention relates to a method of operating a phosphoric acid fuel cell. In particular, the present invention relates to a method of operating a phosphoric acid fuel cell, which makes it possible to improve the energy conversion ratio of the phosphoric acid fuel cell and thus which makes it possible to allow the phosphoric acid fuel cell to generate the power at a high output.

2. Description of the Related Art

The phosphoric acid fuel cell has a power-generating cell which is provided with an electrolyte-electrode assembly comprising an anode electrode, a cathode electrode, and an electrolyte layer interposed between the both electrodes. The electrolyte layer is generally constructed such that pores of a porous silicon carbide member is impregnated with concentrated phosphoric acid (liquid electrolyte). However, another type of the electrolyte layer is also known, in which a membrane of basic polymer such as polybenzimidazole is impregnated with phosphoric acid or sulfuric acid (see U.S. Pat. No. 5,525,436).

In the phosphoric acid fuel cell, a predetermined number of the power-generating cells are electrically connected in series with each other to provide a fuel cell stack which is accommodated in a container. When the phosphoric acid fuel cell is operated, at first, the hydrogen-containing gas is supplied to the anode electrode, and the oxygen-containing gas is supplied to the cathode electrode.

The hydrogen in the hydrogen-containing gas is ionized on the anode electrode in a manner as represented by the following reaction formula (A). As a result, the hydrogen ion and the electron are generated.

$$2H_2 \rightarrow 4H^+ + 4e \quad (A)$$

The hydrogen ion is moved toward the cathode electrode via the electrolyte layer. On the other hand, the electron is extracted by an external circuit which is electrically connected to the anode electrode and the cathode electrode. The electron is utilized as the DC electric energy to energize the external circuit, and then it arrives at the cathode electrode.

The hydrogen ion moved to the cathode electrode and the electron arrived at the cathode electrode via the external circuit cause the reaction as represented by the following reaction formula (B) together with the oxygen in the oxygen-containing gas supplied to the cathode electrode.

$$O_2 + 4H^+ + 4e \rightarrow 2H_2O \quad (B)$$

The reaction according to the reaction formula (B) is slow as compared with the reaction formula (A). That is, the reaction represented by the reaction formula (B) constitutes the rate-determining step in the overall cell reaction of the phosphoric acid fuel cell.

As described in Japanese Laid-Open Patent Publication No. 5-3042, U.S. Pat. No. 4,978,591, and Japanese Laid-Open Patent Publication No. 9-320620, the phosphoric acid fuel cell is generally operated in a state in which the pressure at the anode electrode is retained to be slightly higher than the pressure at the cathode electrode, for the following reason. If the pressure at the anode electrode is lower than the pressure at the cathode electrode, $H_2O$, which is generated by the cathode electrode in accordance with the reaction formula (B), is pressurized toward the cathode electrode. For this reason, $H_2O$ is hardly removed. Therefore, the phosphoric acid in the electrolyte layer leaks into $H_2O$, and the performance of the phosphoric acid fuel cell is deteriorated.

However, when there is such a difference between the pressures at the both electrodes, the ratio of oxygen is low at the cathode electrode. The reaction according to the reaction formula (B) is slow. For this reason, the energy conversion ratio of the phosphoric acid fuel cell is low.

If the pressure of the anode electrode is extremely higher than the pressure of the cathode electrode, a part of hydrogen in the hydrogen-containing gas supplied to the anode electrode passes through the electrolyte layer without being ionized, and it arrives at the cathode electrode. That is, the reaction efficiency of the reaction formula (A) described above is lowered. Therefore, the energy conversion ratio of the phosphoric acid fuel cell is low.

Further, in this case, phosphoric acid in the electrolyte layer leaks from the electrolyte layer together with hydrogen, and it is finally discharged to the outside of the container of the phosphoric acid fuel cell. Furthermore, the electrolyte layer itself is damaged in some cases. If the electrolyte layer is damaged, the performance of the phosphoric acid fuel cell is lowered.

SUMMARY OF THE INVENTION

The present invention has been made in order to solve the problems as described above, an object of which is to provide a method of operating a phosphoric acid fuel cell, which makes it possible to remarkably improve the energy conversion ratio of the phosphoric acid fuel cell and which makes it possible to avoid the leakage of liquid electrolyte such as phosphoric acid from a matrix and the damage of an electrolyte layer.

In order to achieve the object described above, the present invention lies in a method of operating a phosphoric acid fuel cell comprising an anode electrode to which hydrogen-containing gas is supplied, a cathode electrode to which oxygen-containing gas is supplied, and an electrolyte which is interposed between the both electrodes, the electrolyte including a matrix composed of basic polymer impregnated with acidic liquid electrolyte; wherein the phosphoric acid fuel cell is operated in a state in which a pressure on the cathode electrode is higher than a pressure on the anode electrode. The matrix referred to herein indicates a carrier for carrying the liquid electrolyte.

The matrix and the liquid electrolyte are strongly attracted to one another in the electrolyte layer comprising the matrix of the basic polymer impregnated with the acidic liquid electrolyte. Therefore, the matrix is excellent in ability to retain the liquid electrolyte. That is, the liquid electrolyte hardly leaks from the matrix in the electrolyte layer.

Further, the matrix, which is composed of the basic polymer, has the high mechanical strength as compared with the silicon carbide porous member. Accordingly, it is possible to construct the electrolyte layer which is hardly damaged. Further, the matrix has the low gas permeability. Therefore, the diffusion of the hydrogen in the hydrogen-containing gas toward the cathode electrode is remarkably suppressed before being ionized. Accordingly, it is possible to improve the energy conversion ratio of the phosphoric acid fuel cell.

The reaction represented by the reaction formula (B) described above is facilitated by increasing the pressure on the cathode electrode as compared with the anode electrode. Accordingly, it is possible to further improve the energy conversion ratio of the phosphoric acid fuel cell. Therefore, the phosphoric acid fuel cell effects the power generation at a high output.

It is preferable that a ratio between an absolute pressure on the cathode electrode and an absolute pressure on the anode electrode is not more than 2, for reliably avoiding the damage of the electrolyte layer and the leakage of the liquid electrolyte from the matrix.

It is preferable that a material, which has a structural unit of monomer of secondary amine, is used as the basic polymer, since such a basic polymer is excellent in ability to retain the liquid electrolyte, and the gas permeability of such a basic polymer is low as well.

When polybenzimidazole is used as the basic polymer having the structural unit of monomer of secondary amine, then the matrix is especially excellent in ability to retain the liquid electrolyte, and the gas permeability is remarkably low. Therefore, the use of polybenzimidazole is more preferable.

Preferred examples of the acidic liquid electrolyte are exemplified by any one of phosphoric acid, sulfuric acid, and methylsulfonic acid.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The method of operating the phosphoric acid fuel cell according to the present invention will be explained in detail below with reference to the accompanying drawings, as exemplified by preferred embodiments.

Figure 1:
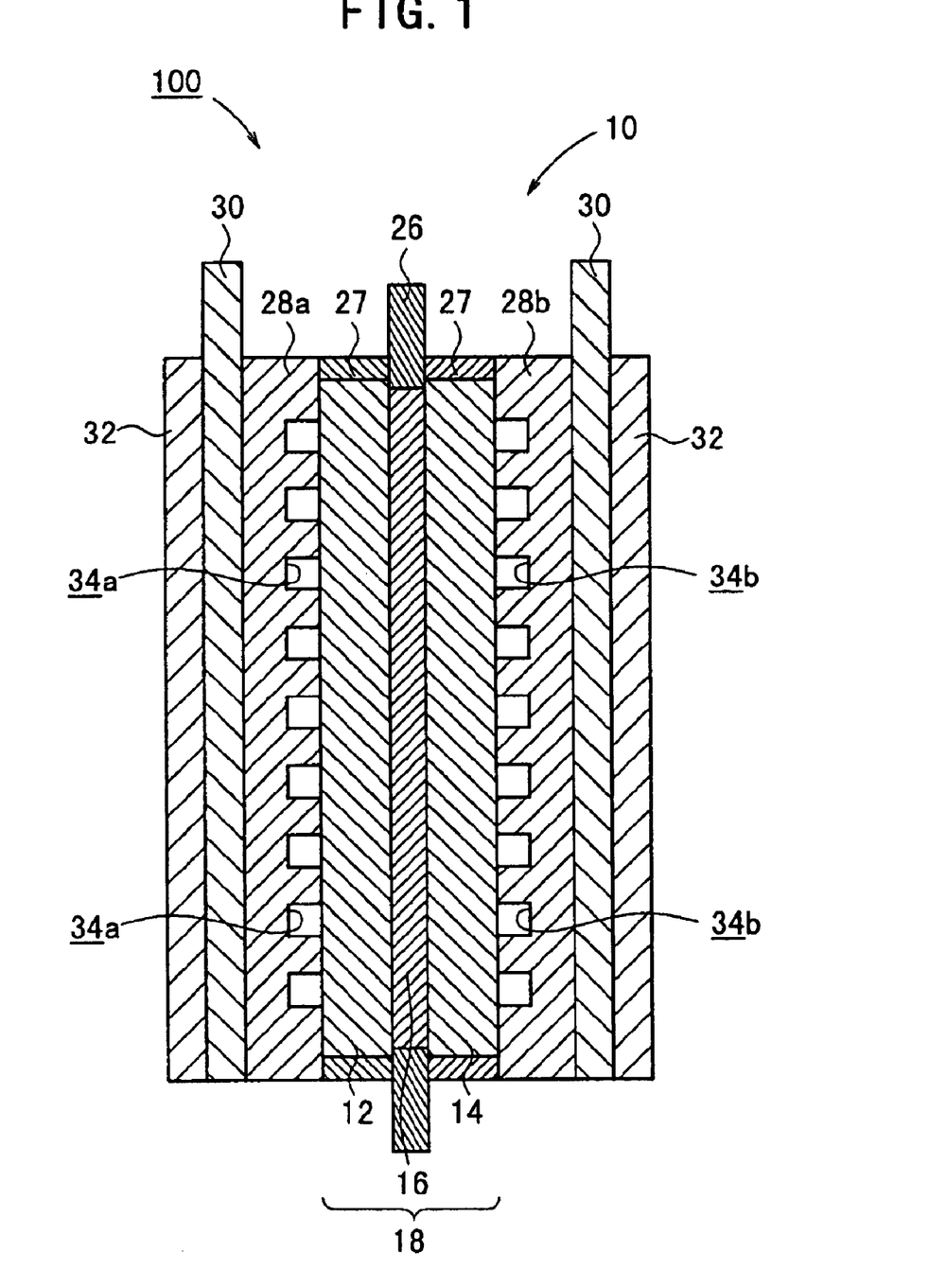
FIG. 1 shows a schematic sectional view illustrating an arrangement of a power-generating cell provided for a phosphoric acid fuel cell.
Figure 2:
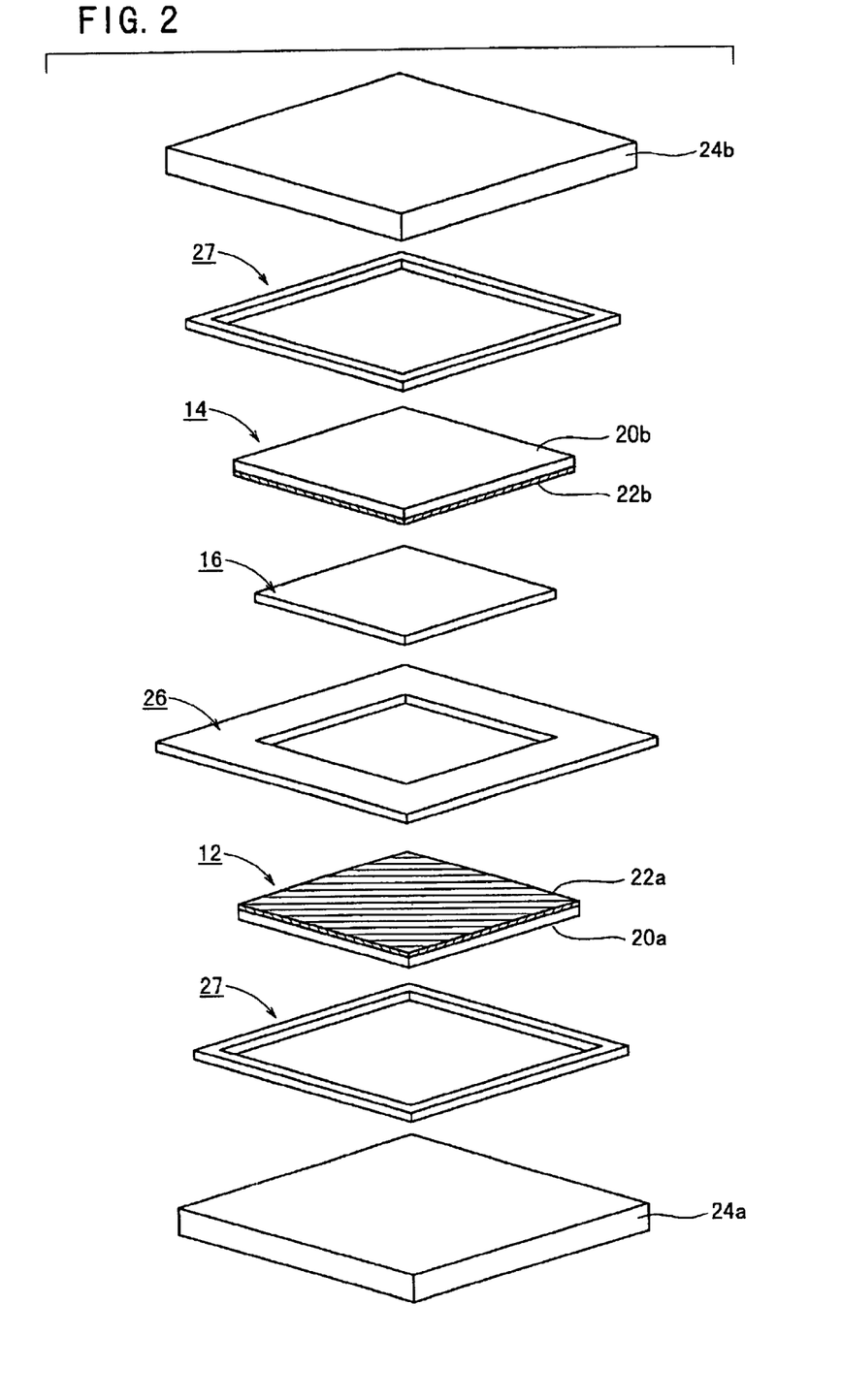
FIG. 2 shows, with partial omission, an exploded perspective view illustrating a state in which an electrolyte-electrode assembly of the power-generating cell shown in FIG. 1 is manufactured.

At first, FIG. 1 shows a schematic arrangement of a power-generating cell of a phosphoric acid fuel cell. The power-generating cell 10 includes an electrolyte-electrode assembly 18 comprising an anode electrode 12, a cathode electrode 14, and an electrolyte layer 16 interposed between the both electrodes 12, 14. Specifically, as shown in FIG. 2, each of the anode electrode 12 and the cathode electrode 14 comprises a gas diffusion layer 20a, 20b composed of carbon cloth or the like, and an electrode catalyst layer 22a, 22b composed of porous carbon particles with platinum alloy carried on the surface, the porous carbon particles being uniformly laminated on the surface of the gas diffusion layer 20a, 20b. In FIG. 2, reference numerals 24a, 24b indicate a lower press plate and an upper press plate to be used when the electrolyte-electrode assembly 18 is manufactured respectively.

The electrolyte layer 16 comprises a matrix composed of basic polymer impregnated therein with acidic liquid electrolyte such as phosphoric acid, sulfuric acid, and methanesulfonic acid. In this arrangement, the acidic liquid electrolyte and the basic matrix are attracted to one another. Accordingly, the matrix is excellent in ability to retain the liquid electrolyte. Therefore, as for the electrolyte layer 16, the liquid electrolyte hardly leaks out from the matrix.

Further, the matrix composed of the basic polymer has a high mechanical strength and a low gas permeability as compared with a silicon carbide porous member. Therefore, it is possible to construct the electrolyte layer 16 which is hardly damaged, and it is possible to construct the phosphoric acid fuel cell which is excellent in energy conversion ratio.

The basic polymer for constructing the matrix is not specifically limited provided that it is successfully impregnated with the liquid electrolyte at the inside and it successfully retains the liquid electrolyte. However, as represented by the following chemical formulas (1) to (4), the basic polymer may be preferably exemplified by those having the structural unit of monomer of secondary amine.

(1)

(2)

(3)

(4)

Especially, polybenzimidazole represented by the chemical formula (1) is especially preferable, because it is excellent in ability to retain the liquid electrolyte, and it is extremely low in gas permeability.

The electrolyte layer 16 is accommodated at the inside of a frame-shaped seal member 26 (see FIG. 1). Similarly, the anode electrode 12 and the cathode electrode 14 constitute the electrolyte-electrode assembly 18 accommodated in frame-shaped seal members 27, 27 respectively.

The power-generating cell 10 is constructed such that the electrolyte-electrode assembly 18 is interposed between a pair of separators 28a, 28b. In the arrangement as described above, respective electrode catalyst layers 22a, 22b of the anode electrode 12 and the cathode electrode 14 abut against the electrolyte layer 16 (see FIG. 2).

Collecting electrodes 30, 30 are electrically connected to the separator 28a attached to the anode electrode 12 and the separator 28b attached to the cathode electrode 14 of the power-generating cell 10 respectively. Further, end plates 32, 32 are attached to the outer sides of the collecting electrodes 30, 30. Thus, a fuel cell stack 100 is constructed.

Of course, a fuel cell stack may be constructed as follows. That is, a predetermined number of the power-generating cells 10 are electrically connected in series. Subsequently, the collecting electrodes 30, 30 are electrically connected to the separator 28a attached to the anode electrode 12 of the power-generating cell 10 located at the first end and the separator 28b attached to the cathode electrode 14 of the power-generating cell located at the second end respectively. Further, the end plates 32, 32 are attached to the outer sides of the collecting electrodes 30, 30.

The end plates 32, 32 are connected to one another by the aid of unillustrated bolts. Gas flow passages 34a, 34b, which serve as flow passages for the hydrogen-containing gas or the oxygen-containing gas to be supplied to the anode electrode 12 or the cathode electrode 14 and for the unreacted gas to be discharged to the outside of the container of the phosphoric acid fuel cell respectively.

Figure 3:
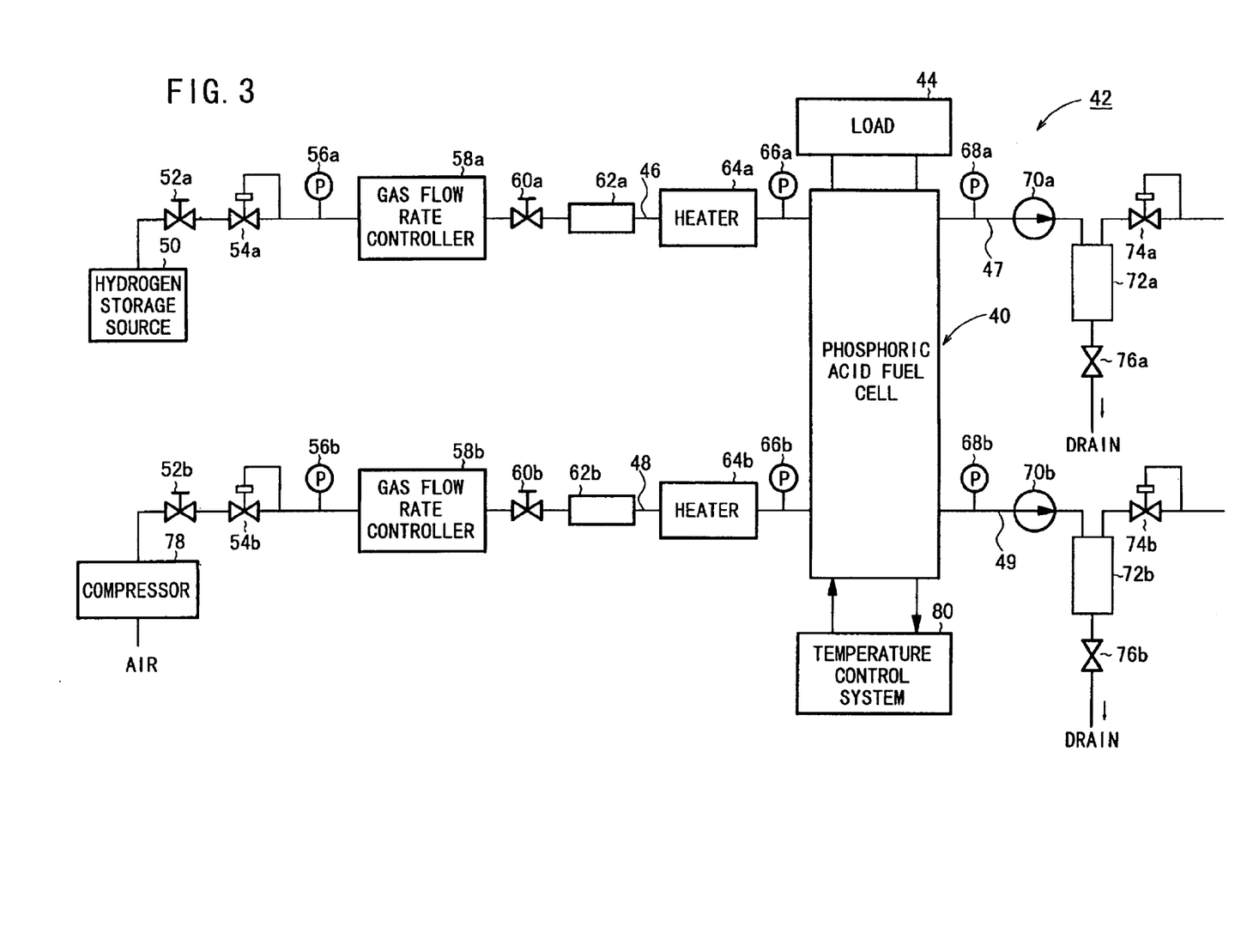
FIG. 3 illustrates a schematic arrangement of a fuel cell system constructed by incorporating peripheral equipments into a phosphoric acid fuel cell provided with the power-generating cell shown in FIG. 1.

The fuel cell stack 100 as described above is accommodated in the container, and thus the phosphoric acid fuel cell 40 shown in FIG. 3 is constructed. FIG. 3 shows a schematic arrangement of a fuel cell system 42 into which the phosphoric acid fuel cell 40 is incorporated.

A load 44 such as a motor is electrically connected to the collecting electrodes 30, 30 (see FIG. 1) of the phosphoric acid fuel cell 40. On the other hand, a hydrogen-containing gas supply passage 46 (see FIG. 3) and a hydrogen-containing gas discharge passage 47 communicating with the gas flow passage 34a of each of the power-generating cells 10 for constructing the fuel cell stack, and an oxygen-containing gas supply passage 48 and an oxygen-containing gas discharge passage 49 communicating with the gas flow passage 34b are connected to the phosphoric acid fuel cell 40.

A hydrogen storage source 50 for supplying the hydrogen-containing gas at a high pressure, a solenoid-operated valve 52a, a pressure-reducing valve 54a, a pressure sensor 56a, a gas flow rate controller 58a, a shut off valve 60a, a check valve 62a, a heater 64a, and an inlet side pressure sensor 66a are installed in this order into the hydrogen-containing gas supply passage 46 from the upstream side toward the inlet side of the phosphoric acid fuel cell 40. On the other hand, an outlet side pressure sensor 68a, a heat exchanger 70a, a gas/liquid separator 72a, and a back pressure valve 74a are installed into the hydrogen-containing gas discharge passage 47. Further, a solenoid-operated valve 76a is provided on the outlet side of the gas/liquid separator 72a.

The oxygen-containing gas supply passage 48 and the oxygen-containing gas discharge passage 49 are constructed in the same manner as the hydrogen-containing gas supply passage 46 and the hydrogen-containing gas discharge passage 47 described above. Therefore, the same constitutive components are designated by the same reference numerals affixed with symbol "b", detailed explanation of which will be omitted. A compressor 78 for supplying the air as the oxygen-containing gas is arranged on the upstream side of the oxygen-containing gas supply passage 48.

In the fuel cell system 42, the operating temperature of the phosphoric acid fuel cell 40 is controlled by using a temperature control system 80.

Next, a method of operating the phosphoric acid fuel cell according to the embodiment of the present invention will be explained.

At first, the hydrogen-containing gas at the high pressure is supplied from the hydrogen gas storage source 50 on the side of the hydrogen-containing gas supply passage 46. The hydrogen-containing gas passes through, for example, the pressure-reducing valve 54a, the gas flow rate controller 58a, and the heater 64a, and it is adjusted to have a predetermined pressure, a predetermined amount, and a predetermined temperature. After that, the hydrogen-containing gas is supplied to the gas diffusion layer 20a (see FIG. 2) of the anode electrode 12 via the gas flow passage 34a provided for the separator 28a of each of the power-generating cells 10 (see FIG. 1) for constructing the phosphoric acid fuel cell 40, and it arrives at the electrode catalyst layer 22a.

On the other hand, the compressor 78 is operated on the side of the oxygen-containing gas supply passage 48 (see FIG. 3) to supply the oxygen-containing gas such as the air with the phosphoric acid fuel cell 40. In the same manner as the hydrogen-containing gas, the oxygen-containing gas is adjusted for the pressure, the flow rate, and the temperature thereof by the aid of the pressure-reducing valve 54b, the gas flow rate controller 58b, and the heater 64b. After that, the oxygen-containing gas is supplied to the gas diffusion layer 20b (see FIG. 2) of the cathode electrode 14 via the gas flow passage 34b provided for the separator 28b of each of the power-generating cells 10 (see FIG. 1), and it arrives at the electrode catalyst layer 22b.

The hydrogen-containing gas or the oxygen-containing gas, which has passed through the gas flow passage 34a, 34b without being supplied to the anode electrode 12 (see FIG. 1) or the cathode electrode 14, arrives at the gas/liquid separator 72a, 72b via the heat exchanger 70a, 70b provided for the hydrogen-containing gas discharge passage 47 (see FIG. 3) or the oxygen-containing gas discharge passage 49, and it is separated into the gas component and the liquid component by the aid of the gas/liquid separator 72a, 72b.

In the operating method according to the embodiment of the present invention, the pressure at the cathode electrode 14 (see FIG. 1) is higher than the pressure on the anode electrode 12. Such a situation can be easily provided, for example, such that the supply pressure of the oxygen-containing gas supplied to the cathode electrode 14 is higher than the supply pressure of the hydrogen-containing gas supplied to the anode electrode 12. Alternatively, the pressure loss of the gas diffusion layer 20b (see FIG. 2) of the cathode electrode 14 may be higher than that of the anode electrode 12. In this case, a dense type of carbon cloth may be used as the gas diffusion layer 20b of the cathode electrode 14.

As described above, the power-generating cell 10 (see FIG. 1) of the phosphoric acid fuel cell 40 (see FIG. 3) includes the matrix for constructing the electrolyte layer 16, the matrix being composed of the basic polymer which is excellent in mechanical strength. Therefore, even when the differential pressure between the cathode electrode 14 and the anode electrode 12 is large, the electrolyte layer 16 is hardly damaged.

Further, in this arrangement, in the electrolyte layer 16, the acidic liquid electrolyte and the matrix as the basic polymer are strongly attracted to one another. Therefore, the liquid electrolyte hardly leaks from the matrix.

Of course, the differential pressure between the both electrodes 12, 14 is set so that the electrolyte layer 16 is not damaged and the liquid electrolyte does not leak from the matrix. Such a differential pressure changes depending on the type of the basic polymer of the matrix as well. However, in order to reliably avoid the damage of the electrolyte layer 16 and the leakage of the liquid electrolyte from the matrix, it is preferable that the ratio between the absolute pressure on the cathode electrode 14 and the absolute pressure on the anode electrode 12 is within 2.

The hydrogen-containing gas and the oxygen-containing gas, which are supplied to the anode electrode 12 and the cathode electrode 14 respectively, are extremely suppressed for the passage through the electrolyte layer 16, for the following reason. The gas permeability of the matrix is low. Therefore, the hydrogen in the hydrogen-containing gas is extremely suppressed for the direct reaction with the oxygen in the oxygen-containing gas. Thus, the energy conversion ratio of the phosphoric acid fuel cell 40 (see FIG. 3) is improved.

That is, the hydrogen is highly efficiently ionized as represented by the reaction formula (A) described above in the electrode catalyst layer 22a (see FIG. 2) of the anode electrode 12. As a result, large amounts of hydrogen ion and electron are generated. The electron is converted into the electric energy to energize the load 44 such as a motor which is electrically connected to the phosphoric acid fuel cell 40 (see FIG. 3).

On the other hand, the hydrogen ion passes through the electrolyte layer 16 (see FIGS. 1 and 2), and it arrives at the electrode catalyst layer 22b (see FIG. 2) of the cathode electrode 14. The reaction represented by the reaction formula (B) described above is caused in the electrode catalyst layer 22b by the hydrogen ion, the electron arrived at the cathode electrode 14 via the load 44, and the oxygen in the oxygen-containing gas supplied to the cathode electrode 14 and passed through the gas diffusion layer 20b of the cathode electrode 14. Thus, $H_2O$ is produced.

In this embodiment, as described above, the phosphoric acid fuel cell 40 is operated in the state in which the pressure on the cathode electrode 14 is higher than that of the anode electrode 12. Therefore, the ratio of oxygen in the electrode catalyst layer 22b of the cathode electrode 14 is high as compared with any operating method of the conventional technique in which the phosphoric acid fuel cell is operated while increasing the pressure on the anode electrode 12 as compared with the pressure on the cathode electrode 14. Accordingly, the reaction represented by the reaction formula (B) described above is facilitated, and the reaction velocity thereof is improved. The reaction of the reaction formula (B) is the rate-determining step in the overall cell reaction of the phosphoric acid fuel cell 40. Therefore, the energy conversion ratio of the phosphoric acid fuel cell 40 is remarkably improved, as the reaction velocity according to the reaction formula (B) is improved.

As described above, the energy conversion ratio of the phosphoric acid fuel cell 40 can be improved by operating the phosphoric acid fuel cell 40 in the state in which the pressure on the cathode electrode 14 is higher than the pressure on the anode electrode 12. The power generation can be effected at a high output even in the case of a large current density in the phosphoric acid fuel cell 40 in which the energy conversion ratio is improved. That is, it is possible to construct the phosphoric acid fuel cell 40 which is excellent in power-generating performance.

During the operation, the temperature of the phosphoric acid fuel cell 40 is maintained to be about 160° C. by the aid of the temperature control system 80. Therefore, produced $H_2O$ is in the vapor phase (steam) which is promptly discharged to the oxygen-containing gas discharge passage 49 together with the unreacted oxygen-containing gas via the gas flow passage 34b of the separator 28b, after being diffused in the gas diffusion layer 20b of the cathode electrode 14. Therefore, it is possible to avoid the discharge of the liquid electrolyte of the electrolyte layer 16 together with produced $H_2O$.

EXAMPLES (1) Production of Phosphoric Acid Fuel Cell 40

A matrix, which was composed of a polybenzimidazole film of width: 66 mm×length: 66 mm×thickness: 50 μm, was weighed, and then it was immersed in phosphoric acid having a concentration of 85% for not less than 24 hours. The concentration of phosphoric acid in the matrix arrived at the equilibrium to provide an electrolyte layer 16 comprising the matrix impregnated with phosphoric acid. The electrolyte layer 16 was vacuum-dried at 80° C., followed by being weighed again. The weight was compared with the weight of the polybenzimidazole film before the immersion to calculate the number of moles of phosphoric acid in the electrolyte layer 16. Further, the number of molecules of phosphoric acid per structural unit of polybenzimidazole was calculated from the number of moles. As a result, the number of molecules of phosphoric acid per structural unit of polybenzimidazole was 10.2. The thickness of the matrix impregnated with phosphoric acid was 102 μm.

On the other hand, an ethylene glycol solution, in which carbon powder and polytetrafluoroethylene powder were dispersed, was applied to one end surface of carbon cloth having a thickness of 300 μm, followed by being dried to volatilize and remove only ethylene glycol. Thus, a carbon/polytetrafluoroethylene layer was formed. This layer plays the following role. That is, the surface of the carbon cloth is smoothened, and phosphoric acid in the electrolyte layer 16 is prevented from seepage to the carbon cloth.

Porous carbon particles, which carried a platinum alloy-based catalyst on the surface, were moistened with pure water, and then they were dispersed in ethylene glycol. An obtained solution was uniformly applied onto the carbon/polytetrafluoroethylene layer described above in accordance with the screen printing method, followed by being dried to volatilize and remove only ethylene glycol.

In accordance with the procedure described above, an anode electrode 12 and a cathode electrode 14 each having a thickness of 350 μm were manufactured, in each of which a gas diffusion layer 20a, 20b was composed of the carbon cloth formed with the carbon/polytetrafluoroethylene layer, and an electrode catalyst layer 22a, 22b was composed of the porous carbon particles with the platinum alloy-based catalyst carried on the surface.

Subsequently, as shown in FIG. 2, the anode electrode 12 in a frame-shaped seal member 27 was placed on the lower press plate 24a of the press machine (not shown) so that the electrode catalyst layer 22a was directed upwardly. Further, the electrolyte layer 16 in a frame-shaped seal member 26 made of polytetrafluoroethylene having a thickness of 80 μm, and the cathode electrode 14 in a frame-shaped seal member 27 were placed on the anode electrode 12 in this order. The cathode electrode 14 was placed so that the electrode catalyst layer 22b was directed downwardly.

The pressurizing and heating treatments were applied to these components by the lower press plate 24a and the upper press plate 24b for thirty seconds. The pressing force was 4 MPa, and the temperature was 145° C. Accordingly, an electrolyte-electrode assembly 18 was obtained, in which the anode electrode 12 and the cathode electrode 14 were integrally joined to the both surfaces of the electrolyte layer 16, the electrolyte layer 16 was accommodated in the frame-shaped seal member 26, and the anode electrode 12 and the cathode electrode 14 were accommodated in the frame-shaped seal members 27, 27.

Subsequently, separators 28a, 28b, on which gas flow passages 34a, 34b were provided, were arranged on both surfaces of the electrolyte-electrode assembly 18. Further, collecting electrodes 30a, 30b and end plates 32, 32 were arranged at the outside of the separators 28a, 28b. The both end plates 32, 32 were connected to one another by means of unillustrated bolts. Thus, a fuel cell stack 100 comprising a single power-generating cell 10 was manufactured.

The fuel cell stack 100 manufactured as described above was accommodated in a container, and thus a phosphoric acid fuel cell 40 was produced.

(2) Operation of Phosphoric Acid Fuel Cell 40

Peripheral equipments shown in FIG. 3 were incorporated into the phosphoric acid fuel cell 40 obtained as described above to construct a fuel cell system 42. The hydrogen and the air were supplied to the phosphoric acid fuel cell 40 to operate the phosphoric acid fuel cell 40 so that the gas utilization factor, which was defined by the value obtained by multiplying, by 100, the quotient obtained by dividing the amount of gas consumed in relation to the reaction by the gas supply amount, was 67% for the anode electrode 12 and 50% for the cathode electrode 14.

In this procedure, the hydrogen supply pressure for the anode electrode 12 was 151.3 kPa (absolute pressure), and the air supply pressure for the cathode electrode 14 was 301.3 kPa (absolute pressure). That is, the ratio between the absolute pressures for the both electrodes was 1.99. In this state, the phosphoric acid fuel cell 40 was operated at a variety of current densities while controlling the temperature at 160° C. This operation was designated as Working Example 1. The respective supply pressures of the hydrogen and the air were determined from measured values obtained by the inlet side pressure sensors 66a, 66b.

The phosphoric acid fuel cell 40 was operated in the same manner as in Working Example 1 except that the hydrogen supply pressure for the anode electrode 12 was 151.3 kPa, and the air supply pressure for the cathode electrode 14 was 201.3 kPa (ratio between the absolute pressures of the both electrodes=1.33). This operation was designated as Working Example 2.

Further, the phosphoric acid fuel cell 40 was operated in the same manner as in Working Example 1 except that both of the hydrogen supply pressure and the air supply pressure for the both electrodes 12, 14 were 201.3 kPa (ratio between the absolute pressures of the both electrodes=1). This operation was designated as Comparative Example.

Figure 4:
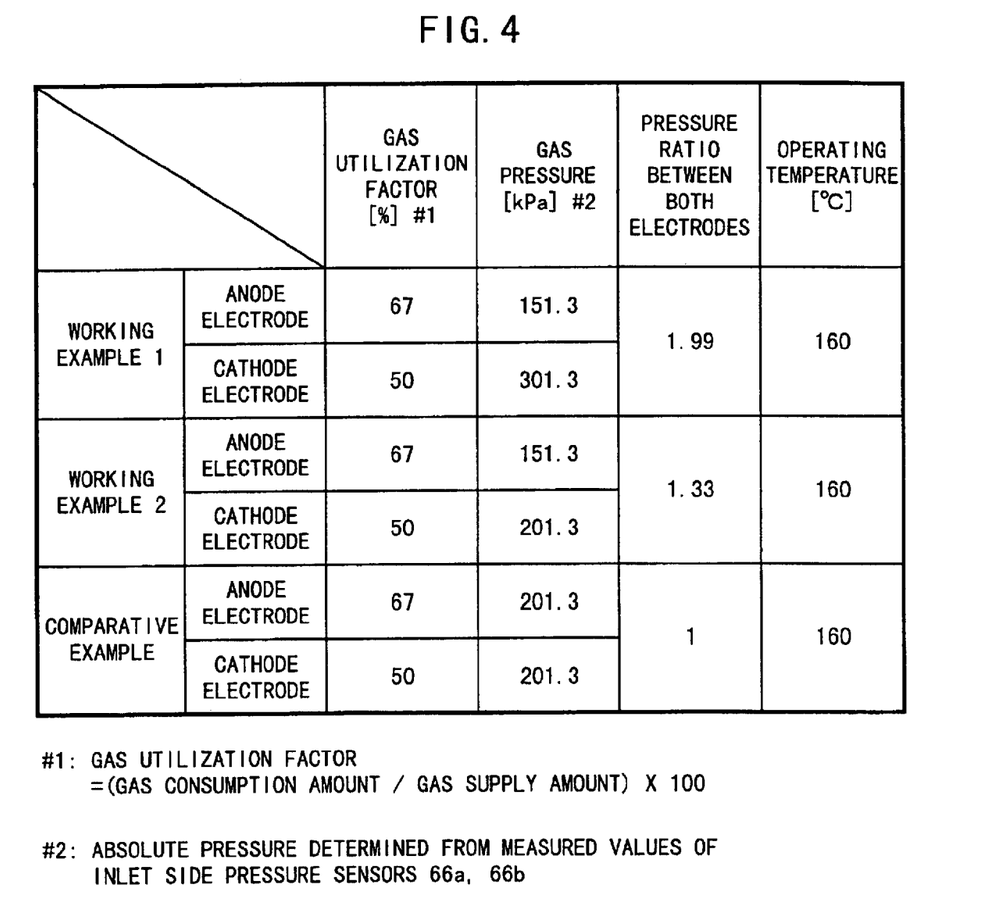
FIG. 4 shows a table illustrating operating conditions in Working Examples 1 and 2 and Comparative Example.

The operating conditions in Working Examples 1 and 2 and Comparative Example are summarized in FIG. 4. The outputs of the phosphoric acid fuel cell 40 at the respective current densities are depicted as a graph in FIG. 5. According to FIG. 5, it is clear that the power generation can be effected at the high output even when the current density is large, by operating the phosphoric acid fuel cell 40 under the operating condition of Working Example 1.

Figure 5:
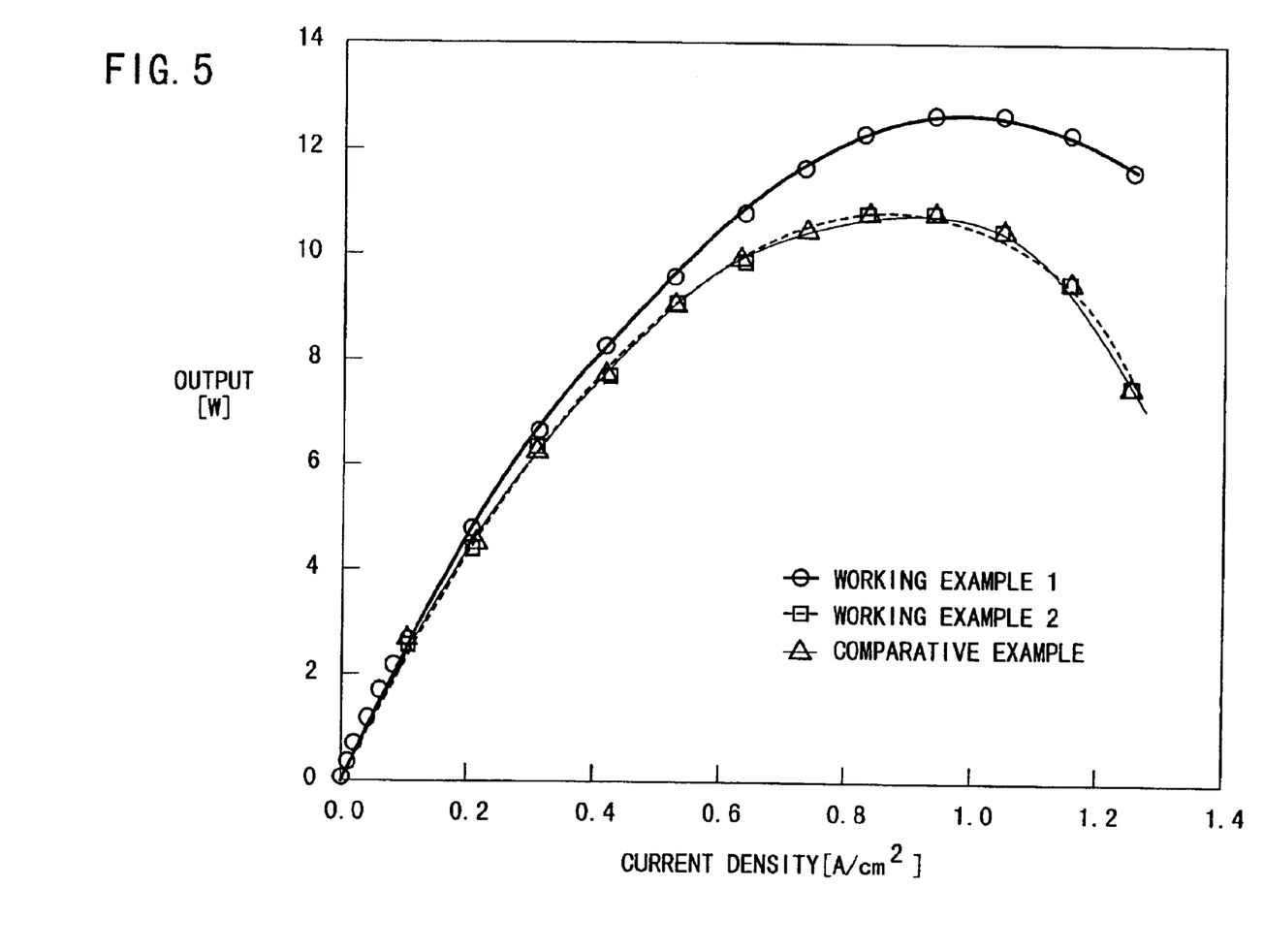
FIG. 5 shows a graph illustrating the relationship between the discharge current and the output for the phosphoric acid fuel cell under the operating conditions in Working Examples 1 and 2 and Comparative Example.

According to FIG. 5, it is clearly understood as well that the output of the phosphoric acid fuel cell 40 at each of the current densities is substantially equivalent under the operating condition of Working Example 2 as compared with the operating condition of Comparative Example, although the hydrogen supply pressure is substantially ½. This fact means that the ionization ratio of hydrogen is improved by increasing the pressure on the cathode electrode 14 as compared with the anode electrode 12, and hence the energy conversion ratio of the phosphoric acid fuel cell 40 is improved.

Neither damage of the electrolyte layer 16 nor the leakage of phosphoric acid from the matrix was observed under the operating conditions of Working Examples 1 and 2.

As explained above, according to the method of operating the phosphoric acid fuel cell of the present invention, the pressure on the cathode electrode is higher than that on the anode electrode. Accordingly, the ionization ratio of hydrogen is improved on the anode electrode, and the reaction of hydrogen ion, electron, and oxygen is facilitated on the cathode electrode. Therefore, the energy conversion ratio of the phosphoric acid fuel cell is remarkably improved. Thus, the power-generating characteristic of the phosphoric acid fuel cell is effectively improved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of operating a fuel cell comprising an anode electrode, a cathode electrode, and an electrolyte layer interpose between said anode electrode and said cathode electrode, said electrolyte layer including a matrix composed of basic polymer impregnated with acidic liquid electrolyte, comprising the steps of:

supplying hydrogen-containing gas from a hydrogen storage source to said anode electrode;

supplying oxygen-containing gas to said cathode electrode; and operating said fuel cell in a state in which a pressure on said cathode electrode is higher than a pressure on said anode electrode.

2. The method of operating said fuel cell according to claim 1, wherein a ratio between an absolute pressure on said cathode electrode and an absolute pressure on said anode electrode is not more than 2.

3. The method of operating said fuel cell according to claim 1, wherein any one of phosphoric acid, sulfuric acid, and methylsulfonic acid is used as said liquid electrolyte.

4. The method of operating said fuel cell according to claim 3, wherein a ratio between an absolute pressure on said cathode electrode and an absolute pressure on said anode electrode is not more than 2.

5. The method of operating said fuel cell according to claim 1, wherein a material, which has a structural unit of monomer of secondary amine, is used as said basic polymer.

6. The method of operating said fuel cell according to claim 5, wherein a ratio between an absolute pressure on said cathode electrode and an absolute pressure on said anode electrode is not more than 2.

7. The method of operating said fuel cell according to claim 5, wherein any one of phosphoric acid, sulfuric acid, and methylsulfonic acid is used as said liquid electrolyte.

8. The method of operating said fuel cell according to claim 1, wherein polybenzimidazole is used as said basic polymer having said structural unit of said monomer of said secondary amine.

9. The method of operating said fuel cell according to claim 8, wherein a ratio between an absolute pressure on said cathode electrode and an absolute pressure on said anode electrode is not more than 2.

10. The method of operating said fuel cell according to claim 8, wherein any one of phosphoric acid, sulfuric acid, and methylsulfonic acid is used as said liquid electrolyte.

11. The method of operating said fuel cell according to claim 10, wherein a ratio between an absolute pressure on said cathode electrode and an absolute pressure on said anode electrode is not more than 2.

* * * * *